United States Patent [19]

Rauschenberger

[11] 3,918,822
[45] Nov. 11, 1975

[54] ADJUSTABLE JOINT

[76] Inventor: Günter Rauschenberger, Gartenstrasse, 744 Asperg, Germany

[22] Filed: Nov. 22, 1974

[21] Appl. No.: 526,370

[30] Foreign Application Priority Data
Nov. 23, 1973 Germany............................ 2358332

[52] U.S. Cl. .................... 403/62; 16/146; 297/355; 403/93
[51] Int. Cl.² ...................... F16C 11/00; F16D 1/12
[58] Field of Search .......... 403/62, 103, 92, 93, 98, 403/73, 161; 297/355, 366, 367, 19, 21; 16/144, 145, 146

[56] References Cited
UNITED STATES PATENTS

| | | | |
|---|---|---|---|
| 3,232,136 | 2/1966 | Bahmuller......................... | 403/93 X |
| 3,304,107 | 2/1967 | Bahmuller........................ | 403/93 UX |
| 3,352,580 | 11/1967 | Kurz et al. ....................... | 16/146 X |
| 3,779,655 | 12/1973 | Toyota.............................. | 403/93 |

FOREIGN PATENTS OR APPLICATIONS

| | | | |
|---|---|---|---|
| 252,497 | 2/1967 | Austria .............................. | 403/103 |
| 252,498 | 2/1967 | Austria .............................. | 403/103 |
| 1,249,352 | 11/1960 | France .............................. | 297/19 |
| 1,246,955 | 8/1967 | Germany .......................... | 403/103 |
| 1,128,100 | 4/1962 | Germany .......................... | 403/93 |

*Primary Examiner*—Werner H. Schroeder
*Assistant Examiner*—Wayne L. Shedd
*Attorney, Agent, or Firm*—Michael S. Striker

[57] ABSTRACT

An adjustable joint for connecting three parts of an assembly, such as a seat part, a backrest part, and a leg part of a foldable piece of furniture, includes three joint members connected to the three parts of the assembly, respectively. Two of the joint members are mounted on the remaining joint member for pivoting movement with respect thereto about two spaced parallel axes between their respective folded and extended positions. One of the two joint members is provided with a serrated detent position, and the other of the two joint members has associated therewith an arresting portion which engages the detent portion as the other joint member is pivoted toward its extended position. The remaining joint member also has an abutment portion which cooperates with the other joint member to prevent its movement beyond the extended position. When the arresting portion is out of engagement with the detent portion, the position of the one joint member with respect to the remaining joint portion may be adjusted, and the one joint member may be arrested in such an adjusted position by pivoting the other joint member toward its extended position. The forces acting on the assembly tend to displace the other joint member toward its extended position so that the arresting action of the arresting portion is proportional to such forces, whereby accidental displacement of the one joint member out of its selected position during the use of the assembly is prevented.

28 Claims, 12 Drawing Figures

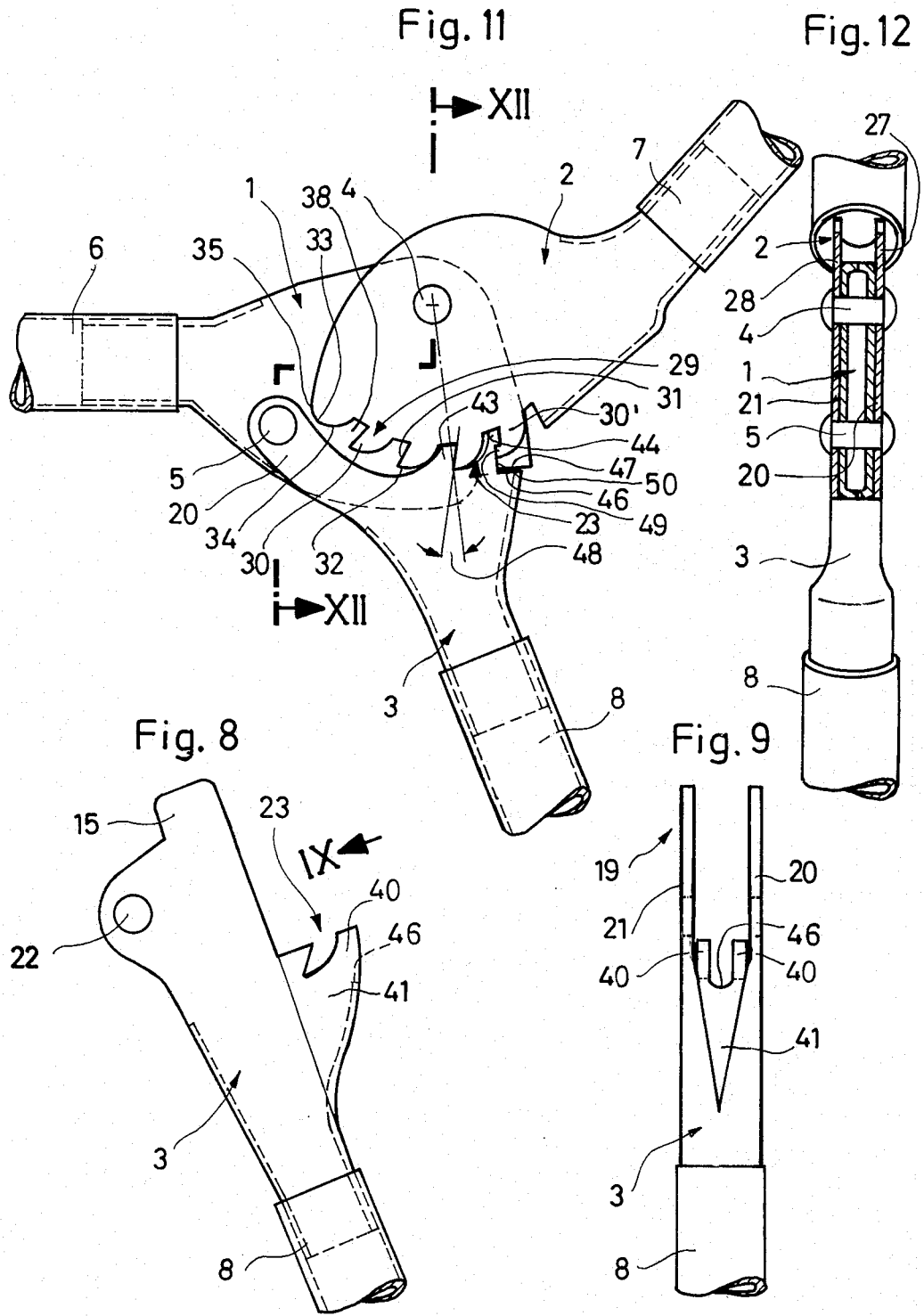

ADJUSTABLE JOINT

BACKGROUND OF THE INVENTION

The present invention relates to an adjustable joint for connecting three parts of an assembly. More particularly, the present invention is concerned with providing a joint for adjustably connecting a seat part, a backrest part, and a leg part of a foldable piece of furniture.

There are already known joints which connect the above-mentioned parts to one another with freedom of movement with respect to one another between a folded position and an extended position of the assembly. Such joints usually have three joint members connected to the three parts of the assembly, respectively, two of the joint members being mounted on the third one for pivoting movement with respect thereto. In the following discussion, such joint will be discussed as being embodied in a foldable patio chair or a foldable lounging chair which may be converted into a bed, but it will be understood that such a joint may find use in other assemblies as well.

It is already known in the furniture-manufacturing industry to provide for the adjustment of the position of the backrest part of the foldable piece of furniture here under discussion with respect to the seat part of such a piece of furniture. This is usually accomplished by providing the joint member associated with the backrest part of the assembly with a detent portion which may be constituted by a circular segment provided with a plurality of teeth, and an independently actuated arresting member is provided in the region of the joint, which arresting member may be moved between a disengaged position and an engaged position in which it engages the respective tooth of the circular segment, depending on the particular position of the horizontal part, and thus arrests the backrest part in the selected position. Depending on the angular teeth of the segment, and on the number of teeth of the detent portion, the backrest part of the assembly may be arrested in as many selected positions as the number of teeth.

However, the heretofore known joints of this kind have several disadvantages. First of all, they usually are of a relatively complex construction and, consequently, they are relatively expensive, particularly because of the high cost of manufacturing the several elements of the joint and the arresting member, and of assembling the joint from its several elements. Another disadvantage is to be seen in the fact that such a joint is not completely reliable, particularly if the arresting member is constructed as a spring-biased pawl engaging the teeth of the detent segment. Namely, in this event, it happens quite often that, during the use of the assembly, particularly when the user of the assembly sits down or moves his center of gravity, that the arresting member disengages from the detent segment and, as a consequence of the pivotal connection of the three joint members and of the reaction force resulting from the shift in the center of gravity, the seat part of the assembly causes the backrest part to suddenly and unexpectedly change its position.

Attempts have already been made to avoid this unexpected change in position of the backrest portion during the use of the assembly by riveting the joint members to one another in such a manner that the pivoting of the joint members about the rivets is possible only after overcoming a significant friction. However, even this solution is unsatisfactory since, due to the wear of the various elements of the assembly, particularly of the riveted connection, the friction to be overcome decreases proportionately to the time for which the assembly is in use. Another drawback of this riveted connection is that the handling of the assembly is rendered more difficult since a substantial force is needed for adjusting the positions of the several elements of the assembly relative to one another. Moreover, since such a foldable assembly is often used in conditions where detrimental influences of bad weather conditions cannot be avoided, such as on patios, on the beach or the like, the danger of rusting which is always present is aggravated by the tightness of the riveted connections, so that under certain circumstances the connection becomes so tight that the position of the backrest part cannot be changed at all, thus rendering the assembly all but unusable.

In another conventional assembly, the danger of unexpected displacement of the backrest part is avoided by providing the pawl which cooperates with the serrated detent segment on the joint member connected to the backrest portion with a recess delimited by the two mutually inclined surfaces, and by providing in the region of the joint a spring-biased spherical element which is received in the recess. In this manner, the arresting member, that is the pawl, can be displaced between the engaged and disengaged positions thereof only after overcoming the force exerted by the spherical element on the surfaces delimiting the recess in the pawl and after displacing the spherical element out of the path of movement of the pawl. The force of the spring biasing the spherical element into the recess may be so selected that the displacement of the spherical element out of the recess cannot occur as a result of any forces acting on the seat or backrest part of the assembly during the normal use thereof. Since the force exerted by the spring has to be relatively high, the handling of this assembly is again rendered more difficult when compared with the unsecured pawl assembly, but the accidental displacement of the backrest part of the assembly out of its selected position is not avoided with a completely certainty nevertheless.

In order to further improve the reliability of such an assembly, it has been proposed to provide an additional pawl which serves the purpose of preventing the unexpected displacement of the backrest part of the assembly during a sudden subjecting of the seat part to load or force. However, the provision of this additional pawl not only involves additional expense, but also necessitates the provision of an additional actuation mechanism, thus rendering the adjustment of the position of the backrest part more complex. For expense and convenience reasons, such an additional pawl is often dispensed with.

SUMMARY OF THE INVENTION

It is a general object of the present invention to avoid the disadvantages of the prior art devices.

More particularly, it is an object of the present invention to provide a simple and reliable joint for adjustably connecting three parts of an assembly to one another.

Still more particularly, it is an object of the present invention to provide an adjustable joint for a foldable piece of furniture.

It is a further object of the present invention to provide a joint for connecting a seat part, a backrest part, and a leg part of a foldable piece of furniture, which is easy to handle, utilizes only a small number of simple elements, and is reliable nevertheless.

It is a concomitant object of the present invention to provide a joint for such a piece of furniture in which unexpected displacement of the backrest part out of its selected position is effectively prevented.

In pursuance of these objects and others which will become apparent hereinafter, one of the features of the present invention is that the joint for connecting the seat, backrest and leg parts of the assembly includes three joint members connected to the three parts of the assembly, respectively, the backrest and leg joint members being mounted on the seat joint member for pivoting with respect thereto about two spaced parallel axes between their respective folded and extended positions. The backrest joint member is provided with a detent segment including a plurality of spaced teeth, the segment sharing the pivoting movement of the backrest joint member about its respective axis. An arresting member is associated with the leg joint member and shares its movement about its respective axis at least during the pivoting displacement of the leg joint member between a predetermined position intermediate the folded and extended positions thereof, and the extended position of the leg joint member. During the shared movement of the arresting member, it engages the detent segment of the backrest joint member, and any further displacement of the leg joint member toward the extended position thereof results in improvement of the engagement. The change of position of the backrest joint member, and thus of the backrest itself which is connected to the backrest joint member, is possible only upon return of the leg joint member into its predetermined intermediate position.

In this manner, the engagement of the arresting member with the detent segment is controlled by the leg joint member, and thus by the leg part of the assembly. Thus, if the position of the backrest is to be adjusted, it is merely necessary to displace the leg part of the assembly into a position in which the leg joint member is in its predetermined intermediate position, upon which the backrest joint member is free to pivot about its respective axis. Conversely, when the backrest part, and the backrest joint member, are to be arrested in their selected positions, it is merely necessary to displace the leg part and thus the leg joint member in an opposite direction, which may be easily done manually or occurs automatically upon occupation of the piece of furniture, so that the arresting member shares the movement of the leg joint member toward its extended position with attendant engagement of the particular tooth of the segment of the backrest joint member by the arresting member. In this manner, it is possible to make the joint simple in construction since, particularly when the arresting member is formed as a portion of the leg joint member, it is only necessary to provide the three joint members and the respective pivots. However, the most important advantage of the arrangement is that the arresting member is pressed against the detent member and into engagement therewith with a force which increases concurrently with the increase in the load to which the assembly is subjected, particularly with the increase in the force to which the seat part of the assembly is subjected. As a consequence of this automatic increase in the arresting force in dependence on the load, the possibility of unexpected change in the position of the backrest part of the assembly is for all intents and purposes nil, even when the load on the assembly is suddenly increased or applied. As a result of the fact that the joint is assembled from only few relatively simple elements, it is possible to make the elements relatively sturdy with attendant reduction of the danger of malfunction, the assembling of the joint is greatly facilitated, and the handling of the assembly during its use is extremely simple.

Usually, the pivot connecting the leg joint member to the seat joint member is located closer to the seat part than the pivot connecting the backrest joint member to the seat joint member. In the currently preferred embodiment of the invention, when the arresting member engages the detent segment, the arrangement is such that the two pivots and the point of engagement of the arresting member with the detent segment are located in the corners of a triangle which has such a configuration that a normal from the axis of the pivot connecting the backrest joint member to the seat joint member to the line connecting the point of engagement of the arresting member with the detent segment with the axis of the pivot connecting the leg point member to the seat joint member intersects this line between its end points and encloses an angle smaller than 45° with a normal to the seat part of the assembly.

In one of the currently preferred embodiments of the present invention, the arresting member is rigidly connected with the leg joint member, and it can also be made of one piece with the leg joint member. It is advantageous to have at least the seat and leg joint members at least partially bifurcated, in which case the backrest joint member may be received in the bifurcated portion of the seat joint member, and the seat joint portion may be accommodated in the bifurcated portion of the leg joint member. When such is the arrangement, the arresting member may be constituted, for instance, by a transverse wall of the leg joint member which may, as the leg joint member is pivoted toward its extended position, enter a recess in the seat joint member, the teeth of the detent segment being so situated as to move during the displacement of the backrest joint member in a path which brings them adjacent to the recess in the seat joint member so that the transverse wall serving as the arresting member upon entering the recess in the seat joint member simultaneously engages the respective tooth of the detent segment. The recess in the seat joint member may also have an additional purpose; namely, the bottom surface of the recess may also serve as an abutment for the transverse wall of the leg joint member, so that the movement of the leg joint member beyond the extended position thereof is prevented by such abutment.

When the requirements for the assembly as far as the load to which it can be subjected or the wear resistance and thus the life span thereof are to be improved, it is currently preferred to form the arresting member as at least one tooth in at least one projecting lateral wall of the leg joint member, wherein the tooth may be made of one piece with, and of the same material as, the leg joint member. On the other hand, it is also possible to make the tooth separately, for instance from hardened steel, and to connect the same to the leg joint member by welding or riveting.

In another embodiment of the present invention, the arresting member is a separate element which is provided with at least one tooth facing toward the detent segment of the backrest joint member. In this embodiment, the leg joint member and the arresting member are provided with associated contact surfaces which are in contact with one another as long as the leg joint member is between the predetermined intermediate position and the extended position thereof, so that during the displacement of the leg joint member toward its extended position the arresting member is pressed into engagement with the detent segment of the backrest joint member; more particularly, the aforementioned tooth of the arresting member is pressed into engagement with the respective tooth of the detent segment. In this embodiment, it is particularly advantageous if the leg joint member and the arresting member are connected to the seat joint member for pivoting about the same pivot. The advantage of this arrangement is that the arresting member, which may be U-shaped in cross-section, may have its tooth or teeth hardened with attendant significant reduction of the wear thereof.

It is possible to handle the assembly of the invention most conveniently if the teeth of the detent segment of the seat joint member have the shape of the teeth of a saw. However, it is also possible to give the teeth any other shape, and still with advantageous results and with the possibility to adjust the position of the backrest part of the assembly with respect to the seat and leg parts in both directions and to arrest the same in the selected positions. For instance, the gaps between the adjacent teeth of the detent segment may have approximately rectangular shapes, and the correspondingly configured arresting member can enter these gaps and form an at least approximately intimate contact with the segment.

When it is desired that the leg joint member is to be prevented from pivoting towards its folded position beyond the aforementioned intermediate position, that is when it is desired that unexpected folding of the leg part of the assembly during its use is prevented, the leg joint member may be provided with a projection which is passed through a slot in the seat joint member and into the interior of the joint. Also in the interior of the joint, and exteriorly of the backrest joint member, there may be provided a circumferentially incomplete annular bulge surrounding the pivot connecting the backrest joint member to the seat joint member, against which bulge the projection of the leg joint member abuts when the leg joint member reaches its predetermined intermediate position upon its movement from the extended position. Thus, the movement of the leg joint member is restricted to the extent necessary for engagement and disengagement of the arresting member with the detent segment, and collapsing of the assembly beneath the user is prevented. When the assembly is to be folded in such a case, the backrest part has to be folded first, upon disengagement of the arresting member from the detent segment in the predetermined intermediate position of the leg joint member, with attendant angular displacement of the circumferentially incomplete bulge into a position in which it does not interfere with the angular displacement of the projection of the leg joint member about its pivoting axis, whereupon the leg part may also be folded.

In a further embodiment of the present invention, both the backrest joint member and the leg joint member may be arranged to the same side of the seat joint member, so that the arresting member is located in the same general plane as the teeth of the detent segment, and abutment surfaces are provided on both the leg joint member and the seat joint portion, which surfaces limit the extent of the angular displacement of the leg joint member with respect to the seat joint member. It will be appreciated that in this arrangement the seat joint portion may be located either outwardly or inwardly of the other two joint members. In order to achieve even in this embodiment a certain degree of locking action like in the previous arrangements, the teeth of the detent segment may, for instance, have the shape resembling saw teeth, that is they may have one flank of gradually increasing slope and another steep flank, and the steep flank of the respective tooth may include an acute angle with the radius of curvature of the detent segment, wherein the tip of the respective tooth, when in the engaged position, is closer to the pivot of the leg joint member than the tooth base. The locking action may be further improved if the teeth of the detent segment and the arresting member are so configured that they engage behind one another in the extended position of the leg joint member. In this situation, the leg joint member may be pivoted into its folded position only subsequently to the disengagement of the teeth of the arresting member from the teeth of the detent segment.

The novel features which are considered as characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

BRIEF DESCRIPTION OF THE DRAWINGS

FIG. 8 is a side elevational view of a further embodiment of the leg joint member according to the invention;

FIG. 9 is a front view taken in direction of the arrow IX of FIG. 8;

FIG. 11 is a further side elevational view of a third embodiment of the present invention; and FIG. 12 is a cross-sectional view taken on line XII—XII of FIG. 11.

DESCRIPTION OF THE PREFERRED EMBODIMENTS

Figure 1:
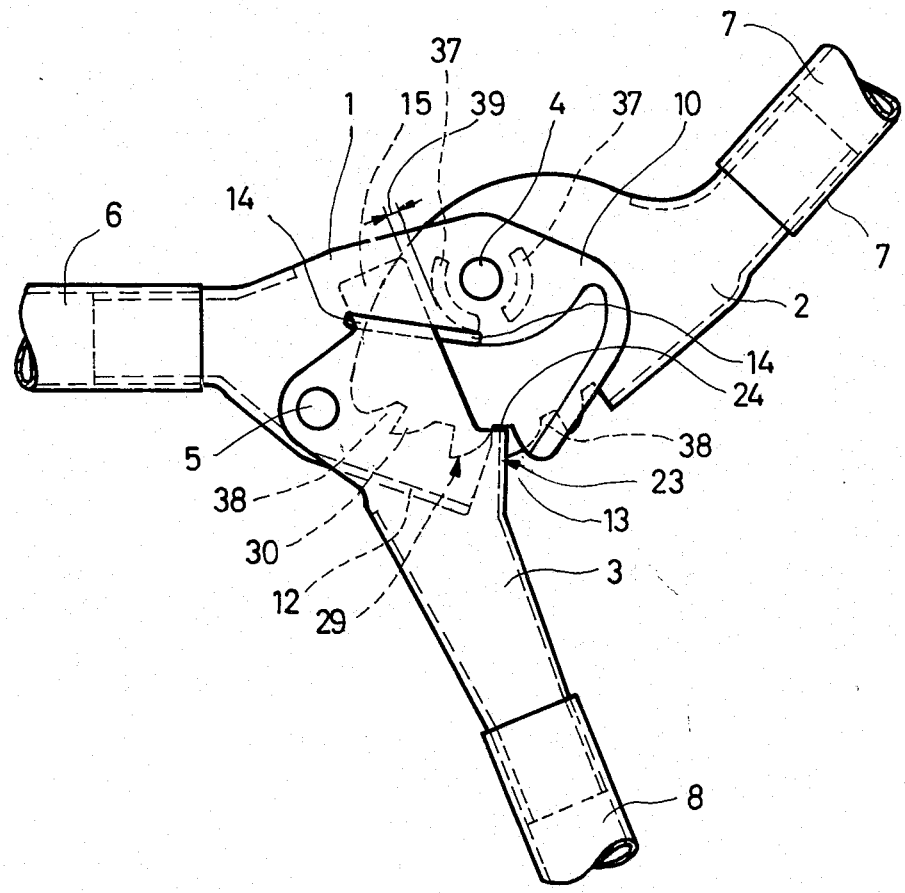
FIG. 1 is a side elevational view of a first embodiment of the joint according to the invention.

Discussing now the invention in detail, and first the embodiment illustrated in FIGS. 1–7, it may be seen that the novel joint includes a seat joint member 1, a backrest joint member 2 and a leg joint member 3. The backrest joint member 2 as well as the leg joint member 3 are articulated to the seat joint member 1 by means of pivots 4 and 5, respectively. Three parts of the assembly according to the invention, that is a seat part 6, a backrest part 7 and a leg part 8, are connected to the respective joint members 1, 2 and 3, in the illustrated embodiment by having tubular end portions which are fitted over the illustrated free ends of the respective joint members 1, 2 and 3. However, the joint members may conceivably be of one piece with the respective parts. Depending on the particular construction of the assembly, the part 6 may also serve a different purpose than to constitute a seat; however, it will be referred to as a seat part.

Figure 2:
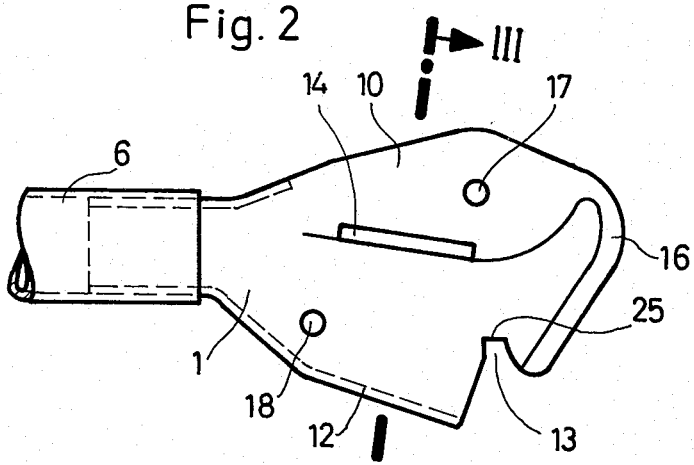
FIG. 2 is a side elevational view of the seat joint member of the embodiment of FIG. 1.
Figure 3:
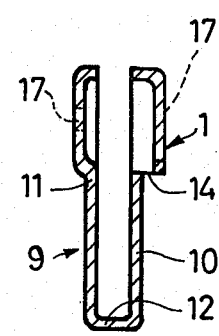
FIG. 3 is a cross-sectional view taken on line III—III of FIG. 2.
Figure 4:
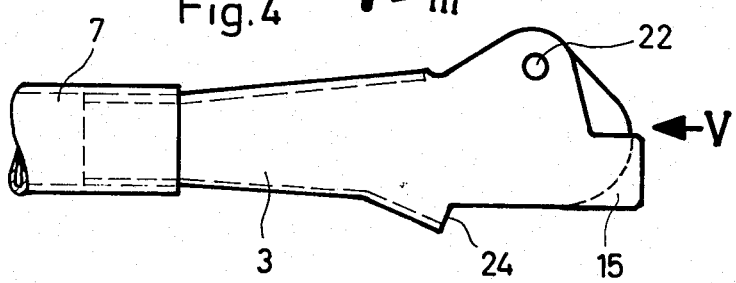
FIG. 4 is a side elevational view of the leg joint member of the embodiment of FIG. 1.

As may be seen in FIGS. 1 to 3, the seat joint member 1 has a bifurcated portion 9 having two arms 10 and 11 which are connected to one another by a transverse wall 12. Each of the arms 10 and 11 is formed with a recess 13, and a slot 14 is provided in the arm 10. As illustrated in FIGS. 1 and 4, the leg joint member 3 is formed with a projection 15 which extends through the slot 14 when the leg joint member 3 is in the position illustrated in FIG. 1. The arms 10 and 11 are further provided with reinforcing bulges 16 and with openings 17 and 18 through which the pivots 4 and 5 extend.

Figure 5:
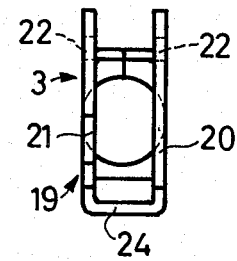
FIG. 5 is a front view taken in direction of the arrow V in FIG. 4.

It may be seen in FIGS. 1, 4 and 5 that the leg joint member 3 also has a bifurcated portion 19 having arms 20 and 21 which surround the seat joint member 1 in the assembled condition, the leg joint member 3 being provided with a bore 22 adapted to receive the pivot 5. The aforementioned projection 15 is formed on an arm 20 of the leg joint member 3. An arresting member 23 is provided on the leg joint member 3, in the illustrated embodiment being constituted by a transverse wall 24 which is so situated as to be introduced into the recess 13 of the seat joint member until it abuts against an abutment 25 of the recess 13.

Figure 6:
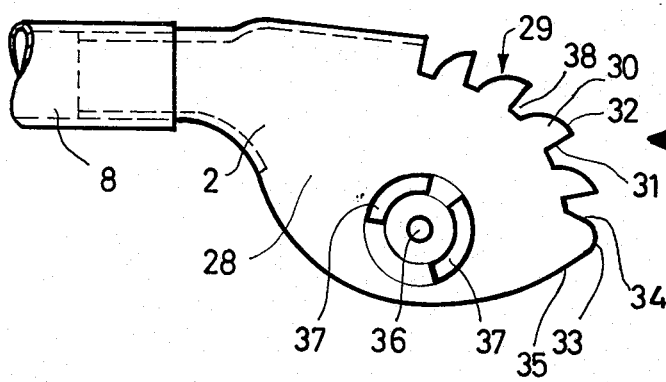
FIG. 6 is a side elevational view of the backrest joint member of the embodiment of FIG. 1.
Figure 7:
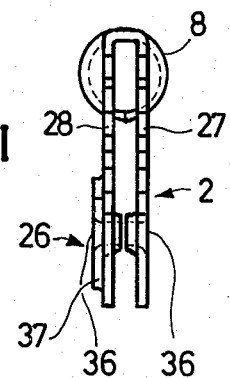
FIG. 7 is a front view taken in direction of the arrow VII of FIG. 6.

FIGS. 1, 6 and 7 illustrate the backrest joint member 2 which also has a bifurcated portion 26 having arms 27 and 28 which are formed along a portion of the circumferential region with a detent segment 29. The detent segment 29 includes a plurality of teeth 30 which in the illustrated embodiment has a shape resembling sawteeth, that is each of the teeth is defined by a steep flank 31 on one side and on the other side by a flat flank 32 which is curved. The leading one of the teeth 30 has a tip 33 which is wider than the tips of the remaining teeth 30, and this tooth has curved flanks 34, 35 on both sides thereof. The backrest joint member 3 is further formed with bores 36 for receiving the pivot 4, and the bores 36 are partially surrounded by circumferentially incomplete annular bulges 37.

Having so discussed the structural features of the three joint members 1, 2 and 3, the operation of these joint members 1, 2 and 3 will now be briefly discussed. The leg joint member 3 which is connected to the leg part 8 of the assembly is pivoted about the pivot 5 between a folded position in which the leg part 8 extends parallel to the seat part 6, and the illustrated extended position in which the arresting member 23 abuts against the abutment 25 of the seat joint member 1. As the leg joint member 3 pivots toward its extended position, the projection 15 thereof enters through the slot 14 of the seat joint member 1 into the interior thereof. Of course, this can only be accomplished when the backrest joint member is in its folded position, that is when the backrest part 7 extends substantially parallel and adjacent to the seat part 6. After the leg joint member 3 has been brought into its extended position, the backrest joint member 2 as well as the backrest part 7 may be moved into their selected intermediate or extended positions. During this movement, the flank 35 of the leading tooth 30 contacts the transverse wall 24 of the leg joint member 3 and exerts a force thereon in the clockwise direction. As a result of this, the leg joint member 3 together with the leg part 8 is slightly pivoted in clockwise direction until the transverse wall 24 is moved out of the path of movement of the detent segment 29. This means that the backrest part 7 may be moved further without encountering any resistance from the detent member 23 until the selected position of the backrest part 7 is obtained upon which the leg part 8 is displaced in the counterclockwise direction so that the arresting member 23 enters one of the gaps 38 between the teeth 30 of the detent segment 29, namely the gap 38 which is at this moment adjacent the recess 13 of the seat joint member 1.

Thus, the backrest part 7 is arrested in the selected position thereof, and a secure arresting action is obtained regardless of the load or force applied to the seat part 6 or the backrest part 7, so that the backrest part 7 cannot be moved from its selected position without intentional action on the part of the user of the assembly. Moreover, the force with which the arresting member 23 is pressed by the leg part 8 into the gap 38 is proportional to the loading of the seat part 6, so that even eventually present forces of a spring, of a fabric or similar cover or the like are incapable of moving the backrest part 7 in the counterclockwise direction, even though only relatively small forces are needed for destroying the engagement of the arresting member 23 with the teeth 30 as a result of the flatness of the flank 32. While the leg joint member 3 may be manually moved into its extended position by acting on the leg part 8, it is sufficient when the seat part 6 is simply loaded which results in displacement of the leg part 8 in the counterclockwise direction until the arresting member 23 enters the gap 38 which is momentarily adjacent to the recess 13 in an automatic fashion. It is to be particularly noted that in this assembly it is not necessary to move the backrest part 7 from its folded position first into its fully extended position; rather, the desired position of the backrest part 7 may be freely selected and the engagement of the arresting member 23 with the detent segment 29 may be accomplished in this selected position.

When the angular position of the backrest part 7 is to be changed, the arresting member 23 is to be removed from the region of the path of movement of the teeth 30. This can be achieved in such a manner, that the load applied to the seat part 6 is removed and the backrest 7 is manually moved in the counterclockwise direction which results in the flat flank 32 of the respective tooth 30 pressing against the arresting member 23 until the same is removed from the path of movement of the detent segment 29. On the other hand, it is also possible to move the leg part 8 manually slightly in the clockwise direction. No matter how the arresting member 23 is removed from the path of movement of the detent segment 29, following such a removal it is possible to adjust the position of the backrest part 7 in both directions. Consequently, the joint permits a tooth-to-tooth adjustment of the position of the backrest part 7 forwardly and rearwardly. When the backrest part 7 is placed into its newly-selected position, the seat part 6 is again subjected to load so that the leg part 8 presses the arresting member 23 into the respective gap 38 of the detent segment 29. It is possible to move the joint member 3 to the extent necessary for engaging and disengaging the detent segment 29, since a space 39 is provided between the projection 15 of the joint member 3 and the bulge 37 of the backrest joint member 2. However, any further movement of the leg part 8 in direction toward its folded position parallel to the seat part 6 is only possible after the backrest part 7 is displaced toward its folded position in which it parallels the seat part 6 so that the circumferentially incomplete annular bulge 37 does not interfere with the pivoting movement of the leg joint member 3 and of its projection 15 toward the folded position. Conversely, when the assembly is to be used after being folded, the leg part 8 has to be pivoted into its extended position first, followed by the backrest part 7.

When the joint is to be capable of withstanding relatively high loads or when its lifespan is to be extended, the leg joint member 3 may be modified as shown in FIGS. 8 and 9. In this embodiment, the arresting member 23 is formed with one or more teeth 40 which may be provided, for instance, in an extended lateral wall 41 of the leg joint member 3. In the event that the arms 20 and 21 of the leg joint member 3 surround the seat joint member 1 and that the arms 27 and 28 are located internally of the seat joint member 1, then the lateral wall 41 must be bifurcated and angularly bent so that the teeth 40 are located in the general plane of the teeth 30 of the detent segment 29 and are capable of engaging the same. However, it is also possible to replace the extended lateral wall 41 by a separate part which may be connected with the leg joint member 3, for example, by welding. In this embodiment, an abutment 46 is provided which abuts against the seat joint member 1 at least when the backrest joint member 2 is in its folded position, so that the extended position of the leg part 8 is predetermined.

Figure 10:
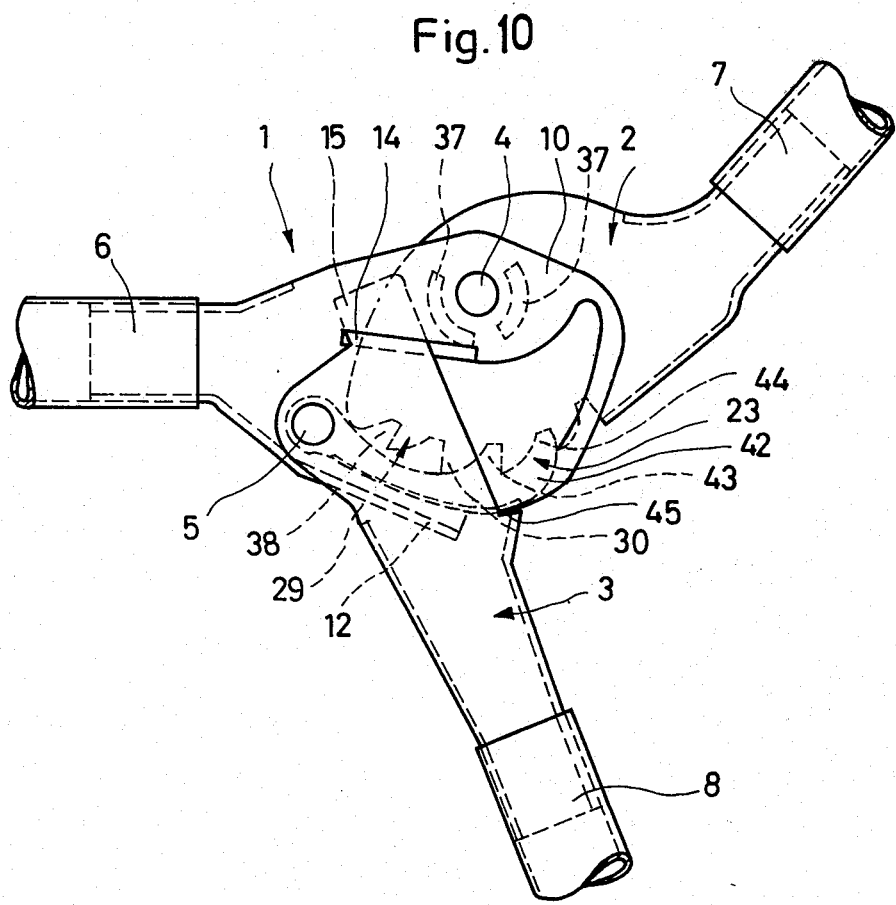
FIG. 10 is a side elevational view of a second embodiment of the joint according to the invention.

FIG. 10 illustrates a further embodiment of the joint according to the present invention, the same reference numerals being used for structurally and functionally similar parts as in the above-discussed embodiment, in which the arresting member 23 is constituted by a bore 42 which, when the arrangement of the joint members 1, 2 and 3 is similar to that described in connection with FIG. 1, is advantageously U-shaped in cross-section. The pawl 42 is mounted on the pivot 5 for pivoting movement about the same and is located interiorly of the seat joint member 1. The pawl 42 is provided at its free end with teeth 43 and 44 which are so shaped that they may enter the gaps 38 between the teeth 30 of the detent segment 29. The extent of the pivoting movement of the pawl 42 is limited on one side by the backrest joint member 2 and on the other side by the transverse wall 12 of the seat joint member 1 and namely in such a manner that the teeth 43 and 44 are capable of traversing a sufficient distance in order to move into and out of the engaged position with the detent segment 29. The pawl 42 extends beyond the transverse wall 12 so that the leg joint member 3 which is provided with an abutment 45 engages the pawl 42 at its side opposite to the teeth 43 and 44 so that during the engagement of the abutment 45 with the pawl 42 the pawl 42 is a functional part which may be viewed as an extension of the leg joint member 3. Thus, the operation of the joint according to this embodiment corresponds to that discussed in connection with the embodiment according to FIG. 1.

However, the joint may also be so constructed that the teeth 43 and 44 are integral parts of the leg joint member 3 and are located in the general plane of the teeth 30 of the backrest joint member 2. Thus, the backrest joint member 2 as well as the leg joint member 3 can be located interiorly of the bifurcated seat joint member 1, or the backrest joint member 2 and the leg joint member 3 can be formed with bifurcated end portions and surround the seat joint member 1 as illustrated in FIGS. 11 and 12. The same reference numerals are again used to designate corresponding elements. In this event, the bifurcated portions may be provided with smooth surfaces, the seat joint member 1 can be formed as, for instance, an upwardly open bifurcated member as shown in FIG. 2 or as an integral plate. A particularly advantageous construction is the formation of the seat joint member 1 as a double shell part with chamfered abutting edge portions as illustrated in FIG. 12. The extent of the pivoting movement of the leg part 8 is again delimited by an abutment 46 which contacts an abutment 47 of the seat joint member 1 in the extended position of the leg joint member 3. Advantageously, the teeth 43 and 44 are formed in the arms 20 and 21 of the leg joint member 3 and they enter the gap 38 between the teeth 30 in the arms 27 and 28 of the backrest joint member 2 as the leg joint member 3 moves toward its extended position.

Advantageously, the planes of the steep teeth flanks 31 enclose acute angles 48 with a radius of the detent segment 29, the tip of the respective tooth 30 being closer to the pivot 4 than the root of the same tooth 30. In this manner, a certain degree of locking action is obtained in the extended position of the leg joint member 3, the locking action being dependent on the load to which the assembly is subjected and causing mutual locking of the backrest part 7 and the leg part 8. The tightness of the riveted connection of the three joint members 1, 2 and 3 can be so selected by dimensioning of the pivots 4 and 5 that the displacement of particularly the leg joint member 3 is accomplished only after overcoming a small amount of friction, such friction being necessary in order to provide a safeguard against an undesirable change in position of the three parts as a result of their own weights. In this embodiment, the succession of the movements of the joint members 2 and 3 is rendered. When it is desired to change the position of the backrest part 7, after the same has been arrested in a selected position, it is merely sufficient to unload the seat part 6 for a short period of time and to slightly move the leg part 7 in counterclockwise direction whereby the teeth 43 and 44 are pressed out of the path of movement of the detent segment 29. Afterwards, the backrest part 7 can be moved into any other selected position and can be arrested in such a position in a simple manner by applying load to the seat part 6 with attendant engagement of the detent member 23 with the detent segment 29. A particularly secure locking of the part 7 in the selected position may be achieved when the teeth 30 of the detent segment 29 engage behind arresting member 23. In order to obtain such a locking action, the teeth 30 may be provided, for instance, on the steep flange 31 in the region of the tips thereof with a projection 49 and the arresting member 23 may be provided with a recess 50 as illustrated in FIG. 11 on teeth 30' and 44.

It will be understood that each of the elements described above, or two or more together, may also find a useful application in other types of assemblies differing from the types described above.

While the invention has been illustrated and described as embodied in a piece of a foldable lounging furniture, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an assembly of the character described having at least three mutually adjustable parts, a combination comprising a joint including a first, a second, and a third joint member connected to the three parts of the assembly, respectively, each of said second and third joint members being connected to said first joint member for a pivoting movement with respect thereto about a respective one of two spaced parallel axes between a folded position and an extended position through a plurality of intermediate positions; detent means on said second joint member; and arresting means sharing the pivoting movement of said third joint member at least between a predetermined one of said intermediate positions and said extended position of said third joint member, and operative for engaging said detent means during said shared pivoting movement so as to arrest said second joint member in a selected one of said intermediate positions of said second joint member at least when said third joint member is in said extended position thereof, and for releasing said detent means upon return of said third joint member into said one intermediate position of the latter.

2. A combination as defined in claim 1, wherein the assembly is a piece of foldable lounging furniture; and wherein the three adjustable parts connected to said first, second and third joint members are a seat part, a backrest part, and a leg part of the piece of lounging furniture, respectively.

3. A combination as defined in claim 2, further comprising a first pivot for pivotally connecting said second joint member to said first joint member, and a second pivot for pivotably connecting said third joint member to said first joint member; wherein said second pivot is situated closer to said seat part than said first pivot, and wherein the axes of said pivots and the point of contact of said arresting means with said detent means are located in the corners of a triangle of such a configuration that a normal from the axis of said first pivot to a line connecting the axis of said second pivot with said point of contact intersects said line intermediate the ends thereof and encloses an angle smaller than 45° with a normal to said seat part.

4. A combination as defined in claim 1, wherein said arresting means is rigidly connected to said third joint member.

5. A combination as defined in claim 1, wherein said arresting means is an integral portion of said third joint member.

6. A combination as defined in claim 1, wherein said detent means includes a detent segment having a plurality of teeth.

7. A combination as defined in claim 6, wherein said first and third joint members have bifurcated portions; wherein said second joint member is received in said bifurcated portion of said first joint member and said first joint member is received in said bifurcated portion of said third joint member; and wherein said arresting means includes a transverse wall formed on said third joint member and cooperating with said detent segment.

8. A combination as defined in claim 7, wherein said first joint member is formed with a recess; wherein the respective one of the teeth of said plurality extends adjacent to said recess when said second joint member is in one of its intermediate positions; and wherein said transverse wall is received in said recess and engages said respective tooth when said third joint member is between said one intermediate position and said extended position thereof.

9. A combination as defined in claim 8, wherein said recess has a bottom surface; and wherein said bottom constitutes an abutment for said transverse wall preventing movement of said third joint member beyond said extended position thereof.

10. A combination as defined in claim 6, wherein said third joint member is formed with at least one extended wall; and wherein said arresting means includes at least one tooth in said extended wall and cooperating with said detent segment.

11. A combination as defined in claim 10, wherein said first and third joint members have bifurcated portions; wherein said second joint member is received in said bifurcated portion of said first joint member and said first joint member is received in said bifurcated portion of said third joint member; and wherein said extended wall is angularly bent so that said tooth in said extended wall is located in the general plane of said detent means.

12. A combination as defined in claim 6, wherein said arresting means includes a pawl situated between said detent segment of said second joint member and said third joint member; wherein said pawl is formed with at least one tooth at a side thereof facing said detent segment; and wherein said joint member and said pawl are provided with associated abutment surfaces which are in contact when said third joint member is between said one intermediate position and said extended position thereof whereby said pawl is pressed by said third joint member into engagement with said detent segment when said abutment surfaces are in contact with one another.

13. A combination as defined in claim 12, further comprising a pivot for pivotably connecting said pawl to said first joint member; and wherein said pivot simultaneously pivots said third joint member between said folded and extended positions thereof.

14. A combination as defined in claim 12, wherein said first joint member has a bifurcated portion including two arms, and a transverse portion connecting said two arms; wherein said transverse wall portion limits the extent of movement of said pawl so that, when the pawl abuts against said transverse wall portion, said tooth of said pawl is disengaged from said circular segment; and wherein said pawl extends beyond said transverse wall and is provided with said abutment surface in the portion thereof which extends beyond said transverse wall portion.

15. A combination as defined in claim 12, wherein said pawl has a U-shaped cross-section.

16. A combination as defined in claim 1, and further comprising means for locking said third joint member and provided on said second joint member, said locking means engaging said third joint member with a freedom of movement between said one intermediate position and said extended position of said third joint member, whereby said detent means may be engaged with and disengaged from said detent segment when said locking means is in the locking position thereof whereas further movement of said third joint member toward said folded position is prevented.

17. A combination as defined in claim 16, wherein said first and third joint members have bifurcated portions; wherein said second joint member is received in said bifuracted portion of said first joint member and said first joint member is received in said bifurcated portion of said third joint member; wherein said first joint member is formed with an elongated slot; wherein said third joint member is formed with a projection extending through said slot into the space defined by said bifurcated portion of said first joint member; and wherein said locking means includes a circumferentially incomplete annular bulge on said second joint member which engages said projection of said third joint member when the same is in said one intermediate position and prevents the movement of said third joint member beyond such intermediate position and toward said folded position as long as said second joint member is in one of said intermediate positions thereof, while permitting such movement when said second joint member is in said folded position thereof.

18. A combination as defined in claim 6, wherein said second and third joint members are situated to the same side of said first joint member; wherein said arresting means is in the same general plane as said detent segment; and wherein said first and third joint members are formed with abutments which cooperate with one another to determine said extended position of said third joint member and to prevent the movement of the latter beyond said extended position thereof.

19. A combination as defined in claim 18, wherein said first joint member has a bifurcated portion having two arms; and wherein said second and third joint members are received between said arms of said bifurcated portion of said first joint member.

20. A combination as defined in claim 18, wherein said second and third joint members have bifurcated portions; and wherein said first joint member is received in said bifurcated portions of said second and third joint members.

21. A combination as defined in claim 18, wherein said arresting means includes at least one tooth formed on said third joint member and operative for entering the respective gap between two adjacent teeth of said plurality of teeth of said detent segment.

22. A combination as defined in claim 6, wherein said teeth of said plurality of teeth of said detent segment have saw-teeth configuration with one steep flank and one gradually increasing flank; and wherein said steep flank engages said arresting means as said second joint member is displaced toward said extended position thereof.

23. A combination as defined in claim 22, wherein said gradually increasing flank is of a curved configuration.

24. A combination as defined in claim 6, wherein the respective adjacent teeth of said plurality of teeth of said detent segment are separated from one another by gaps; wherein the flanks of the respective tooth extend substantially parallel to one another; and wherein said detent means has a configuration substantially corresponding to the shape of said gaps.

25. A combination as defined in claim 6, wherein the tip of the leading tooth of said plurality has a greater circumferential length than the tips of the remaining teeth of said plurality, and wherein both flanks delimiting said leading tooth have curved configurations.

26. A combination as defined in claim 22, and further comprising a pivot connecting said third joint member to said first joint member; wherein said steep flank of the respective tooth of said plurality encloses an acute angle with a radius of curvature of said detent segment, and wherein in a selected one of said intermediate positions of said second joint member the tip of the respective tooth of said plurality is situated closer to said pivot than the root of said respective tooth.

27. A combination as defined in claim 6, wherein said teeth of said plurality are so configurated as to engage beyond the complementarily shaped arresting means when said third joint member is in said extended position thereof.

28. A combination as defined in claim 27, wherein said teeth of said plurality of teeth of said detent segment are formed with projections in the regions of their tips; and wherein said detent means is formed with a corresponding recess for receiving the respective projection of the respective tooth of said detent segment.

* * * * *